US008153984B2

(12) United States Patent
Olm et al.

(10) Patent No.: US 8,153,984 B2

(45) Date of Patent: Apr. 10, 2012

(54) SECURITY SYSTEM WITH DIFFERENT SIZE EMISSIVE PARTICLES

(75) Inventors: Myra T. Olm, Webster, NY (US); Thomas D. Pawlik, Rochester, NY (US); Erwin L. Allmann, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 639 days.

(21) Appl. No.: 12/337,752

(22) Filed: Dec. 18, 2008

(65) Prior Publication Data

US 2010/0155679 A1 Jun. 24, 2010

(51) Int. Cl.
*G01T 1/20* (2006.01)
*G01J 1/58* (2006.01)

(52) U.S. Cl. .................................... 250/367; 250/458.1

(58) Field of Classification Search ............... 250/458.1, 250/367

See application file for complete search history.

(56) References Cited

U.S. PATENT DOCUMENTS

| | | | | |
|---|---|---|---|---|
| 6,436,314 | B1 | 8/2002 | Oshima et al. | |
| 2003/0168635 | A1 | 9/2003 | Hampden-Smith et al. | |
| 2009/0316950 | A1* | 12/2009 | Alasia et al. | 382/100 |
| 2010/0102250 | A1* | 4/2010 | Li et al. | 250/459.1 |

OTHER PUBLICATIONS

T. Soukka et al.; Photochemical Characterization of Up-Converting Inorganic Lanthahide Phosphors as Potential Labels; Journal of Fluorescence, vol. 15, No. 4, Jul. 2005, pp. 513-528.

Maarten Alderliesten, Mean Particle Diameters Part II: Standardization of Nomenclature, Particles and Particle System Characterization, vol. 8, 1991, p. p. 237-241.

* cited by examiner

*Primary Examiner* — David Porta
*Assistant Examiner* — Carolyn Igyarto
(74) *Attorney, Agent, or Firm* — Nelson Adrian Bush

(57) ABSTRACT

A security marker material comprising emissive particles selected from at least two groups with different size distributions and the size distributions satisfy the formula:

$$[(x-z)^2/(S_x^2+S_z^2)]^{1/2}>1$$

wherein x and z are the volume-weighted mean equivalent-spherical diameters of the two particle distributions and $S_x$ and $S_z$ are the standard deviations of the same two distributions. The emissive materials are placed in or on an item. The emissive materials are excited with electromagnetic radiation in one or more specified spectral bands. The electromagnetic radiation is detected in one or more spectral bands from the emissive materials in an image-wise fashion. The attributes of the image are analyzed and characterized and are compared to authentication criteria to determine the authenticity of the marked item.

3 Claims, 6 Drawing Sheets

SECURITY SYSTEM WITH DIFFERENT SIZE EMISSIVE PARTICLES

FIELD OF THE INVENTION

This invention generally relates to emissive security markers and a method of authenticating these markers. It is specifically concerned with security markers applied at very low levels to an object which, when excited with light of appropriate wavelengths, emit radiation which produce a unique image, for authenticating and identifying the object. The marker image is related to the size, and size distribution of particulate security marker as applied to the object.

BACKGROUND OF THE INVENTION

If goods are not genuine, then product counterfeiting has occurred. If goods have been diverted from their intended channel of commerce by, for example, entering into a country where the goods are prohibited by contract or by law, then the goods have been subject to product diversion.

Product counterfeiting occurs on artworks, CDs, DVDs, computer software recorded on CDs or diskettes, perfumes, designer clothes, handbags, briefcases, automobile and airplane parts, securities (e.g. stock certificates), identification cards (driver's licenses, passports, visas, green cards), credit cards, smart cards, and pharmaceuticals. According to the World Health Organization, more than 7% of the world's pharmaceuticals are bogus. This percentage is higher in some countries, such as Colombia, where up to 40% of all medications are believed to be fake. Until recently, the percentage of bogus medications in the United States has been virtually negligible due to a tightly controlled regulatory system has made it extraordinarily difficult for counterfeiters to sell or distribute suspect medications. However, the recent explosion of Internet drug sales from other countries and increasingly sophisticated counterfeiting techniques have substantially increased the amount of fraudulent drugs entering the United States.

Product diversion has also occurred on many of the aforementioned goods. Such diversion could result in the sale and distribution of goods which do not comply with the product specifications required in the markets they are sold. For example, motorcycles intended to be sold without catalytic converters in a region with lower air pollution standards might be diverted to a region which requires catalytic converters. Other negative effects include price inequities in certain markets, loss of exclusivity by some manufacturers or distributors, and damage to the goodwill, patent rights, and trademark rights of the manufacturer. Such diverted goods are sometimes referred to as "gray market" goods. Since the goods are genuine, it is sometimes difficult to determine whether the goods have been improperly diverted. This is especially true for a variety of goods such as, for example clothing, pharmaceuticals, and cosmetics.

The application of security markers or taggants to a object or product for authenticating the origin and intended market of the object product are known in the prior art. These security markers can be incorporated into components which make up the object or can be incorporated into papers, inks, or varnishes that are applied to the object or into labels affixed to the object or packaging for the object. The presence of security markers verifies the authentic origin of the object and is verified by means suited to the particular nature of the marker.

Detection methods for markers are diverse and are suited to the particular nature of the marker. Detection methods can be destructive or non-destructive. An example of a destructive detection method is elemental analysis of the chemical composition of the object and applied marker. Elemental analyses usually require the chemical digestion of a part of the object and analysis of the resulting solution to quantify the elements or compounds contained therein. Destructive methods are, therefore, time consuming and costly.

More conveniently, detection methods are non-destructive. For example, authentication devices can be used which detect the optical or magnetic properties of markers, in situ, without the need to alter or destroy the object on which they reside. A very common non-destructive method of authentication is the detection of specific reflective, absorptive, or emissive responses of marker materials. Emissive materials are common as security markers.

Security markers are of two types, depending on the solubility of the marker material in the carrier used to apply it to an item. In the first instance, if a marker is dispersed in a varnish carrier and it is not soluble in that varnish, it is referred to as a particle-based or a pigment-based marker. Particle-based or pigment-based markers remain intact in the varnish and will appear as particles when examined microscopically. In the second instance, the marker material dissolves in the ink or varnish and is distributed in the carrier on a molecular level. Such markers are referred to as dyes. No discrete marker particles are observed when examining the marked carrier microscopically. A given marker can act as a dye in one carrier, in which it is soluble, and as a particle-based marker in a different carrier, in which it is not soluble.

Organic materials are sometimes defined as materials which contain at least one carbon to hydrogen bond. Examples of inorganic emissive materials which can be used as particulate markers in most inks, varnishes and other carriers are given in U.S. Pat. No. 6,436,314 (Oshima et al.), and in the reference T. Soukka et al., Photochemical Characterization of Up-Converting Inorganic Lanthahide Phosphors as Potential Labels, Journal of Fluorescence, Vol. 15, No. 4, July 2005, pp. 513-528. Additional examples include, but are not limited to,: $CaWO_4$: Eu; $CaMoO_4$: Mn, Eu; BaFBr: Eu; $Y_2O_2S$:Tb; $Y_2O_2S$:Er, Yb; $Y_2O_2S$:Er; $Y_2O_2S$:Eu; $Y_2O_3$: Eu; $Y_2O_2S$: Eu+$Fe_2O_3$; $Gd_2O_2S$:Tb; $Gd_2O_2S$: Eu; $Gd_2O_2S$: Nd; $Gd_2O_2S$: Yb, Nd; $Gd_2O_2S$: Yb, Tm; $Gd_2O_2S$:Yb, Tb; $Gd_2O_2S$: Yb, Eu; LaOF:Eu; $La_2O_2S$:Eu; $La_2O_2S$:Eu Tb; $La_2O_2S$:Tb; $BaMgAl_{16}O_{27}$:Eu; $Y_2SiO_5$: Tb, Ce; $Y_3Al_5O_{12}$: Ce; $Y_3Al_{2.5}Ga_{2.5}O_{12}$: Ce; $YVO_4$: Nd; $YVO_4$: Eu; $Sr_5(PO_4)_3$ Cl:Eu; CaS:Eu; ZnS: Ag, Tm and $Ca_2MgSi_2O_7$:Ce, ZnS: Cu, ZnS: Cu, Au, Al; ZnS: Ag; $ZnSiO_4$: Mn; $CaSiO_3$: Mn, ZnS: Bi; (Ca, Sr)S: Bi; (Zn, Mg)$F_2$: Mn; $CaWO_4$; $CaMoO_4$; ZnO: Zn; ZnO: Bi, and $KMgF_3$: Mn. Particulate markers can be made up of organic or inorganic materials.

Examples of emissive pigments are available on the websites of vendors Epolin, Fabric Color Holding Inc.

Beaver Luminescers and LDP LLC dyes and pigments A specific example of a material which can be used as an organic emissive pigment UVXPBR, a UV excitable material, emitting red visible light available at UVXPBR is insoluble in water and can be used to produce aqueous-based dispersions containing emissive organic pigment particles.

Any group of particles contains particles in a distribution of sizes. A group of particles can be characterized by a mean particle size and a standard deviation characterizing the deviation of particles in the group from the mean of the group. Groups of particles can be characterized as monodispersed if 90% of the particles (1.645 times the standard deviation) have sizes within +/−5% of the mean size for the group. If less than 90% of the particles have sizes within 5% of the mean, than the particles are considered to be polydispersed. Most particulate security markers are polydispersed.

Particles are described as having a multimodal distribution of sizes if a plot of number (frequency) of particles of a given size versus size shows more than one maximum. Each maximum in the plot is referred to as a mode. For instance, if a plot has two maxima, the particle size distribution is said to be bimodal. If a plot has one maximum, the particle size distribution is said to be monomodal. Here, if a collection of particles has a multimodal distribution of sizes, we will refer to the selection of particles corresponding to a given mode as a group of particles.

Particles sizes can be characterized by a variety of methods. These include methods where particles are suspended in a liquid and analyzed by electroresistance methods such as the Coulter Counter, sedimentation methods, laser diffraction or acoustic spectroscopic analysis. Before executing a particle size measurement, it is important to ensure that particles are well-dispersed in the liquid and particles have not aggregated into clusters made up of two or more particles. Particle deaggregation is usually achieved by the homogenization and/or sonication of the particle suspension and, occasionally by the addition of chemical dispersants which coat the particle surfaces and limit aggregation.

Particles can exist in many shapes; however, particle diameters measured by the methods noted above are often quoted in terms of an equivalent-spherical-diameter (ESD). This is the diameter of the sphere with the same volume as the volume of the actual, often non-spherical particle.

Different types of mean particle diameters can be obtained and the type obtained depends on the measurement technique used to obtain the particle size distribution. The examples below use volume-weighted mean ESD and standard deviations to characterize the particle distributions. A complete definition and discussion of different types of mean particle diameters including volume-weighted mean diameter, is given by Maarten Alderliesten, Mean Particle Diameters Part II: Standardization of Nomenclature, Particles and Particle System Characterization, Volume 8, 1991, pp. 237-241.

The authenticity of emissive markers and objects containing emissive markers, is based on features of their emissive response. Features used for authentication of emissive markers include excitation wavelength or wavelengths, emission wavelength or wavelengths, emission intensity, and temporal duration of the emission. An emissive marker will emit only if excited with an appropriate excitation wavelength and will not emit if excited with other excitation wavelengths. Thus, the authentication of an item bearing an emissive marker may be based on the presence of an emissive response in a specific spectral region when the marker is illuminated with electromagnetic radiation in a specific spectral region. The authentication may additionally require the absence of an emissive response in a specific spectral region when the marker is illuminated with electromagnetic radiation in a specific spectral region. Authentication criteria may require that the detected marker emission be within a range of intensities (luminance range) when measured with a given detection system.

For detection systems capable of measuring the temporal evolution and decay of the marker emissive response, authentication criteria may be based on the temporal parameters of this response. Thus, an emissive marker is characterized by a set of parameters including excitation and emission wavelength responses, emission intensity, and emission temporal response. Detection systems can be built to detect one or more of these parameters. Sophisticated detection systems not only detect marker parameters but also test whether they fall within authentication specifications. If all specified parameters are detected and they fall within the authentication specifications, then the item containing the emissive marker is deemed to be authentic. The set of marker parameters detected for authentication and the authentication criteria represent a security marker code.

One approach used to increase the security of marked items is to combine multiple markers, in specific ratios, to generate a new security marker code. As marker codes become more complex, requiring multiple excitation sources and the ability to detect emission at multiple wavelengths, the cost of the detection system increases. This is especially disadvantageous when it is necessary to widely distribute detection systems, for example, to authenticate tickets, passports or other secure documents.

A further disadvantage of authenticating the presence of security markers solely based on emissive characteristics is that, given sufficient expertise and resources, counterfeiters can evaluate the emissive response of goods containing security markers. Counterfeiters can then purchase marker materials necessary to replicate this emissive response, and apply these marker materials to counterfeit goods.

Security providers often endeavor to keep security marker levels low and to hide security markers in selected regions of marked goods; however, as instrumental technology improves, prices for spectrometers capable of detecting low marker levels drop, and the technology required to detect and replicate marker codes become more widely accessible. Additionally, access to security markers has increased with the increase of the number of security companies with internet sites offering direct sale of such markers, with minimal customer screening.

The present invention uses responses related to marker size and size distribution as part of the marker code, providing a less expensive method of generating a more complex, difficult-to-replicate security code.

SUMMARY OF THE INVENTION

Briefly, according to one aspect of the present invention, the invention provides an security marker material comprising emissive particles which can be grouped into at least two groups with different size distributions.

A second aspect of the invention is a security system including a security marker material comprising emissive particles which can be grouped into at least two groups with different size distributions, placing the security marker in or on an item, exciting the security marker with electromagnetic radiation in one or more specified spectral bands, detecting electromagnetic radiation emitted by the security marker in a one or more specified spectral bands in an image-wise fashion, analyzing and characterizing attributes of the image, comparing the image attributes to preset authentication criteria. The size distributions are chosen so that, once applied to an object, differences between at least two particle size distributions can be distinguished by image-wise detection of the marker emission. This invention provides a less expensive method of generating a more complex, difficult-to-replicate security code.

The invention and its objects and advantages will become more apparent in the detailed description of the preferred embodiment presented below.

DETAILED DESCRIPTION OF THE INVENTION

Figure 1:
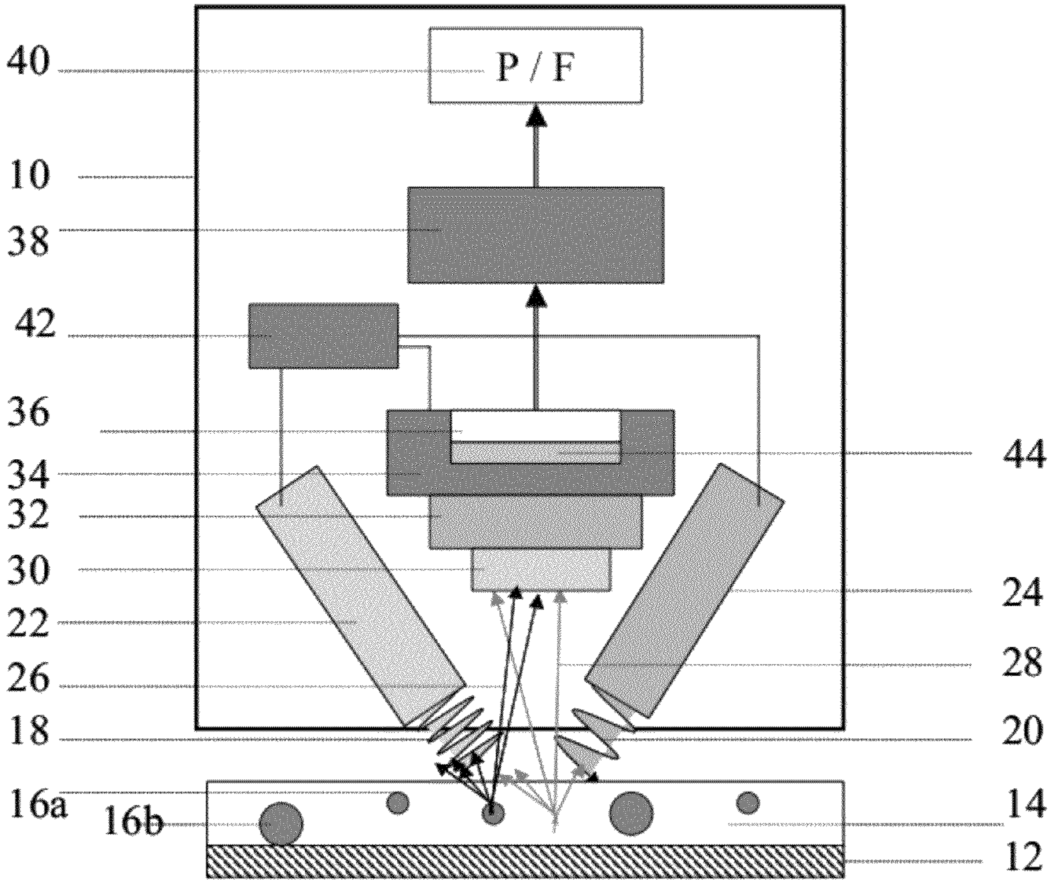
FIG. 1 is a drawing of a security marker detection system.

This invention relates to emissive, particulate, security materials applied to an item and to the image-wise capture of light emanating from the marked item when it is irradiated with electromagnetic radiation of appropriate wavelength. (While the word "light" is used herein, the term is not meant to exclude wavelengths outside the visible spectrum.) Authentication of the item is contingent on evaluating the image of the emissive marker or markers and matching specific image characteristics to pre-determined criteria.

In one embodiment of this invention, marker particles are dispersed in a carrier such as an ink, varnish, or toner and are printed, sprayed, or otherwise coated on or applied to the item to be authenticated. Examples of such items include labels, packaging materials, plastic laminates, and films. Emissive security materials are chosen which will not be soluble in the carrier of choice, so that the chosen markers will act as particulate markers in the chosen carrier. In this embodiment, it is important to use good dispersal techniques to ensure that the marker particles are well-dispersed in the carrier, with no aggregation. Such dispersal techniques are well known to those skilled in particle dispersion technology.

In a second embodiment of this invention, marker particles are incorporated into the item itself. For instance, the marker may be put into a polymer master batch and thereby incorporated into extruded plastic items, film, or thread produced from this marker batch. Woven labels or cloth produced from the marked thread will contain the marker. Similarly, the marker may be incorporated into components used to produce paper or cardboard. In this second embodiment, it is also important to design the marker addition process in such a way as to minimize marker particle aggregation.

In both the first and second embodiments of this invention, the security marker material is chosen to contain at least two groups of emissive particles with different size distributions. In both embodiments, the two groups of particles may additionally be chosen to differ in chemical composition. This has the advantage of enabling one to produce a "custom" security marker material with unique emissive properties (excitation wavelength, emission wavelength and/or temporal emissive response) and/or other improved properties, such as lower abrasiveness, or increased resistance to light fade.

In both of these embodiments, the presence of the security marker material on the item being authenticated is detected by illuminating the item with electromagnetic radiation in one or more spectral bands chosen specifically to excite the security marker, detecting electromagnetic radiation in a one or more spectral bands chosen to match the emission of the security marker material and detecting this emitted electromagnetic radiation in an image-wise fashion.

The size distributions are chosen so that, once applied to an object, differences between at least two particle size distributions can be distinguished by image-wise detection of the marker emission. Authentication criteria include responses related to marker size and size distribution.

Security markers can be excited with electromagnetic radiation in the ultraviolet, visible or infra-red region of the spectrum. Similarly, security markers can be detected by measuring emissions at wavelengths in the ultraviolet, visible or infra-red region of the spectrum. In a preferred embodiment, detection of the marker by unscrupulous individuals is made more difficult by either exciting or detecting the security marker at wavelengths greater than 700 nanometers. In a particularly preferred embodiment, detection of the marker occurs by both exciting and detecting the security marker at wavelengths greater than 700 nanometers.

Image capture can be accomplished by using any digital image capture device such as a camera with a 2-dimensional CMOS, CCD, photodiode or microbolometer array as the radiation sensitive element. Image capture could also be accomplished by using an analog capture device such as a silver halide film-based camera. In one embodiment, the evaluation of the image is done by visual inspection of the image, optionally comparing it to a standard image. In a further embodiment, automated image analysis algorithms are used to process the image data and a CPU compares the results to predetermined criteria.

FIG. 1 shows a security marker detection system 10 which can be used to detect emission of security marker materials in an image-wise fashion, as required in this invention. FIG. 1 also shows the item to be authenticated 12, which is a label with a thin coat of clear varnish 14 applied as an overcoat. The relative thickness of varnish overcoat 14 is exaggerated for clarity. The varnish overcoat 14 contains two groups of emissive marker particles with different size distributions, 16*a* and 16*b*. The security marker detection system 10 irradiates the emissive markers with electromagnetic radiation 18 and 20, produced by illumination devices 22 and 24.

Electromagnetic radiation 18 and 20 is absorbed by the emissive markers 16*a* and 16*b*. Electrons within the markers are excited to higher energy states by the electromagnetic radiation and decay from these energy states with the emission of electromagnetic radiation 26 and 28. The emitted electromagnetic radiation 26 and 28 is filtered by filter set 30, focused and optionally magnified by lens assembly 32 and enters camera assembly 34, forming an image on the plane of imaging detector 36. Before hitting the plane of the imaging detector 36, the electromagnetic radiation may pass through a filter array 44.

The information from imaging detector 36 passes to an image processing unit 38. Image analysis algorithms are performed in image processing unit 38 which compare properties of the marker image to preset criteria for image authentication. If the marker image meets these criteria, a signal is passed to display unit 40, indicating the authentic nature of the marker image. The on-off cycles of the illumination devices 22 and 24 and image acquisition timing of the camera assembly are controlled by control circuit 42.

The security marker detection system 10 is designed to collect the electromagnetic radiation 18 and 20 emitted by the markers and to exclude extraneous radiation, such as ambient light, or electromagnetic radiation 26 and 28 used for excitation of the marker. The security marker detection system 10 optionally is capable of magnification. Camera assembly 34 may be a still camera or a video camera.

Optionally, the security marker detection system can contain one, two, or more illumination devices. These can be identical or can be chosen to generate radiation in distinct wavelength bands. There are two illumination devices shown in FIG. 1 (22 and 24). The complexity and security of the total authentication system can be increased by using combinations of markers chosen so that one marker type is excited by radiation in one wavelength band and another marker type is excited by radiation in a second wavelength band. For example in FIG. 1, marker 16*a* can be chosen so that it can be excited by electromagnetic radiation 18 but not by electromagnetic radiation 20, and marker 16*b* can be chosen so that the reverse is true.

The filter set 30 and filter array 44 in the security marker detection system 10 can be chosen and placed so that only electromagnetic radiation within a specific wavelength band is detected. Optionally, the security marker detection system can be designed to selectively detect electromagnetic radiation in more than one wavelength band. The security marker detection system 10 can be designed to selectively respond only to the electromagnetic radiation 26 emitted by marker 16*a* and to electromagnetic radiation 28 emitted by marker 16*b*. The security marker detection system 10 may optionally detect the temporal response of markers 16*a* and 16*b*, separately, in an image-wise fashion.

Figure 2:
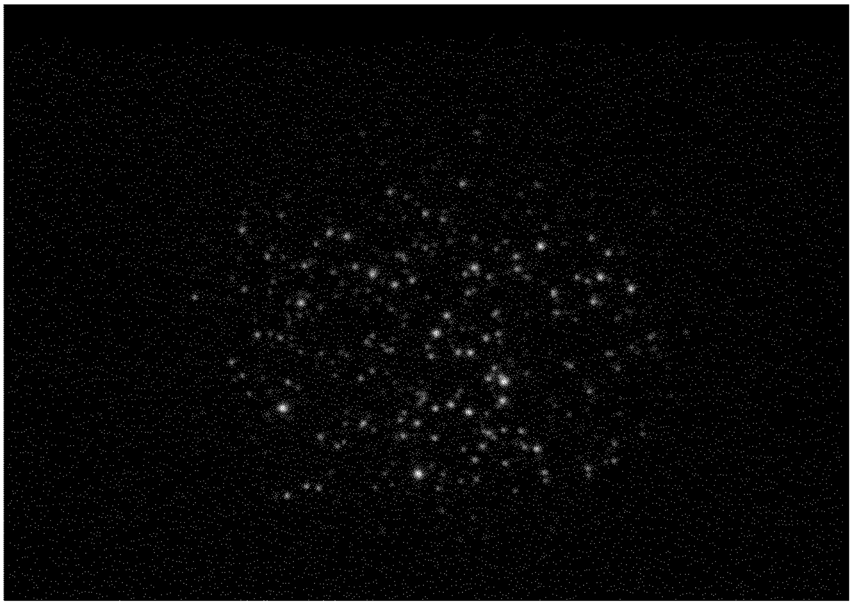
FIG. 2 shows an image of the emission from a security marker material.

In this invention, the amount of particulate marker used is chosen so that the images of the emission from marker particles appear as discrete bright spots corresponding to emission from isolated marker particles. When the correct particulate marker image is chosen, the image of the emission from security marker material, as applied to the item to be authenticated, appears as isolated bright spots on a dark background. An example is shown in FIG. 2. The particles in this image had a volume-weighted mean ESD of less than 20 microns. The image was taken with a security marker detection system with a magnification factor less than 20.

In this invention, the size of the particles comprising the security marker must be chosen to be compatible with the method used to apply the marker in or on the item to be authenticated. For instance, many printing applications require marker particles smaller than 10 microns to allow transfer of the particles through the printing process and retention of the particles in the thin ink or varnish print layers. Particle sizes smaller than 1 micron are often preferred for some spray applications of marker. On the other hand, much larger marker particles can be added to a polymer master batch and integrated into extruded plastic pieces. Generally, however, security applications require marker particles which are smaller than 30 microns and often, smaller than 10 microns.

It is possible to obtain images of the emission from such small discrete marker particles with minimal magnification. This is because the light emitted by a particle is omni-directional. The cone of light which transects the imaging plane is much larger than the emissive particle itself. The size of the bright spot depends on the original particle size, on the optical characteristics of the item the particle is in or on, and on details of the security marker detection system, such as sensitivity, magnification, and depth of focus.

In both the first and second embodiments of this invention, the security marker material is chosen to contain at least two groups of emissive particles with different size distributions. The two particle groups are chosen so that the difference between their mean diameters is large enough to distinguish in the image of the particle emission as applied to the item to be authenticated. A useful figure-of-merit (FOM) has been empirically defined, which enables prediction of which groups of emissive marker particles can be combined to give a marker material with a unique particle emission image.

The FOM is simply the absolute value of the difference of the mean volume-weighted equivalent-spherical-diameters of the two groups divided by the pooled standard deviations of the two groups. This mathematical expression reduces to the following form: $FOM=[2(x-z)^2/(S_x^2+S_z^2)]^{1/2}$ where x and z are the volume-weighted mean equivalent-spherical diameters of the two particle distributions and $S_x$ and $S_z$ are the standard deviations of the same two distributions. The FOM as defined has the useful property of being independent of particle size scale as long as the ratios of the mean equivalent-spherical diameters of the two particle distributions and the ratios of the standard deviations of the two particle distributions remain constant.

Figure 3:
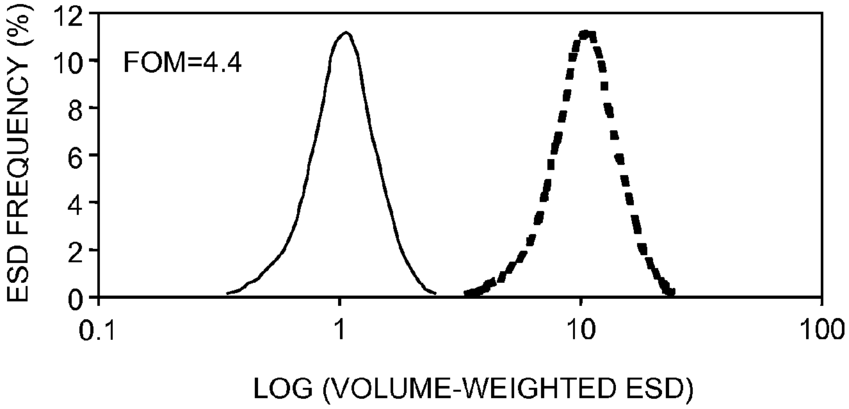
FIG. 3 is a plot of particle size distributions of two marker particle groups with two different size distributions and a figure of merit of 4.4.
Figure 4:
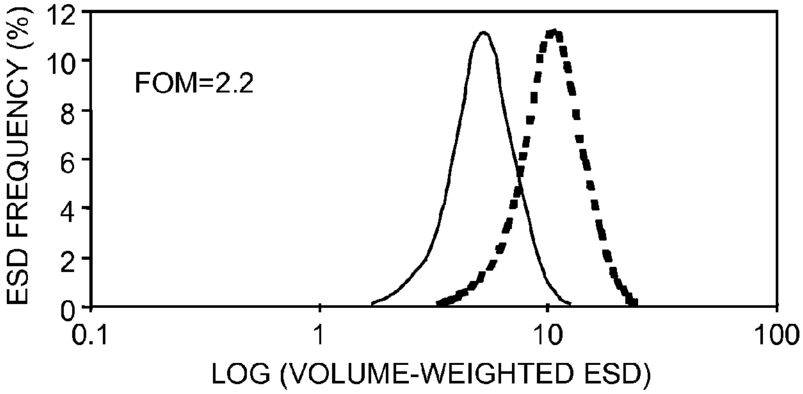
FIG. 4 is a plot of a particle size distributions of two marker particle groups with two different size distributions and a figure of merit of 2.2.
Figure 5:
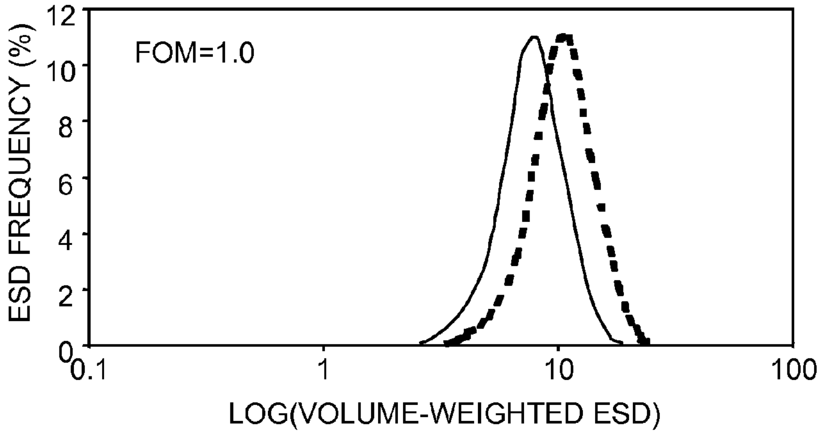
FIG. 5 is a plot of a particle size distributions of two marker particle groups with two different size distributions and a figure of merit of 1.

FIGS. 3-5 show examples of particle size distributions such as obtained from laser diffraction size analysis measurements on inorganic marker particles. In each plot, the y-value represents the frequency (in percent) that particles with a equivalent spherical diameter x occur in the particle distribution. The x axis is a plotted logarithmically. FIGS. 3-5 each show two groups of particle size distributions. The corresponding FOM is shown on each figure. The table below shows the volume-weighted mean ESDs and the standard deviations, and the FOMs for the particle distributions in FIGS. 3-5. These particle distributions are typical of the polydisperse distributions seen in inorganic security marker populations.

TABLE 1

Particle size data and FOM for particle distributions shown in FIGS. 3 to 5. Sizes are in microns.

| FIG. | First particle group | Second particle group | Figure of Merit |
|---|---|---|---|
| 2 | ES = 11<br>S = 3.2 | ES = 1.1<br>S = 0.32 | 4.4 |
| 3 | ES = 11<br>S = 3.1 | ES = 5.5<br>S = 1.6 | 2.2 |
| 4 | ES = 11<br>S = 3.1 | ES = 8.2<br>S = 2.4 | 1.0 |

The relative standard deviation of a particle distribution is given by the ratio of the standard deviation to the ESD. The FOM values are calculated for groups of security marker particles with volume-weighted equivalent spherical diameters ranging from 1 micron to 20 microns and with relative standard deviations ranging from 0.10 to 0.50. Sizing data was obtained from aqueous dispersions of marker particles analyzed with a Horiba LA-920 laser diffraction particle size analyzer manufactured by Horiba Instruments Inc., Irvine, Calif.

Pairs of security marker particle groups are selected and combined together in a 1 to 1 ratio to produce security marker materials with FOMs ranging from 0.5 to 5. Mixing of security marker particle groups was accomplished by weighing equal amounts of each marker group into a vial, adding a know amount of clear varnish to the vial and dispersing both marker groups by homogenization and sonication. The varnish marked in this manner was then coated by a spin coating method onto white cards to produce clear varnish layers that were 3 to 4 microns thick. Images of particle emission were captured with a security marker detection system similar to that shown in FIG. 1 where illumination devices 22 and 24, filter sets and filter arrays 30 and 44 were chosen to match the excitation and emission properties of the security marker materials. In all cases, marker levels in varnish were empirically adjusted to give discrete bright spots corresponding to isolated marker particles.

The images of the emissions from these security marker materials were evaluated visually and with the particle analysis algorithms available in the software program, ImageJ, available from the National Institute of Health. It was determined that a FOM of at least 1.4 is required to be able to visually or automatically distinguish differences between images of the emission from white cards containing marker material, where the marker material was (i) marker material with a first size distribution, (ii) marker material with a second size distribution or, (iii) a combination of two marker materials with different size distributions.

Thus, the security marker material of this embodiment of the invention is chosen to contain at least two groups of emissive particles with different size distributions where the following criterion is met: $[(x-z)^2/(S_x^2+S_z^2)]^{1/2} \geqq 1$, where x and z are the volume-weighted mean equivalent-spherical diameters of the two particle distributions and $S_x$ and $S_z$ are the standard deviations of the same two distributions.

Figure 6:
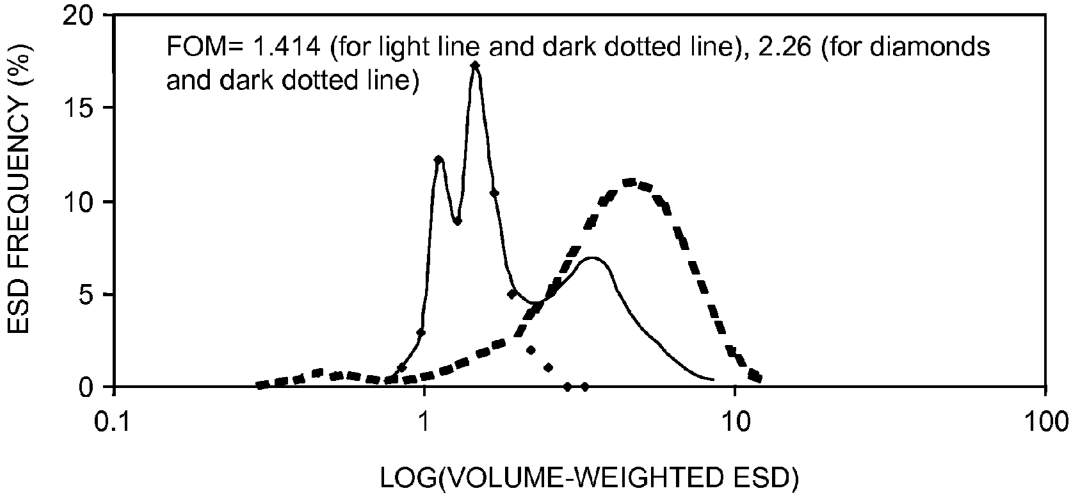
FIG. 6 is a plot of a particle size distributions of two marker particle groups, one of which has a trimodal size distribution.

FIG. 6 shows the size distributions for one of the pairs of marker materials which were imaged alone, and in combination. One of the marker groups has a multimodal size distribution. The FOM is evaluated by taking the ESD and standard deviation for the entire population marker group including all three particle size modes. The image of the emissions from this mixture of particle was just distinguishable from the images from its two components. The FOM is calculated and one could theoretically obtain from a group of particles containing just the two smaller size modes (diamonds in FIG. 6) combined with the particles with the size distribution represented by the dotted line in FIG. 6. Clearly, the FOM is higher than for this hypothetical marker pair compared to the pair including the tri-modal particle group. It is generally preferable to have marker particles with monomodal size distributions for the practice of this invention.

Figure 7:
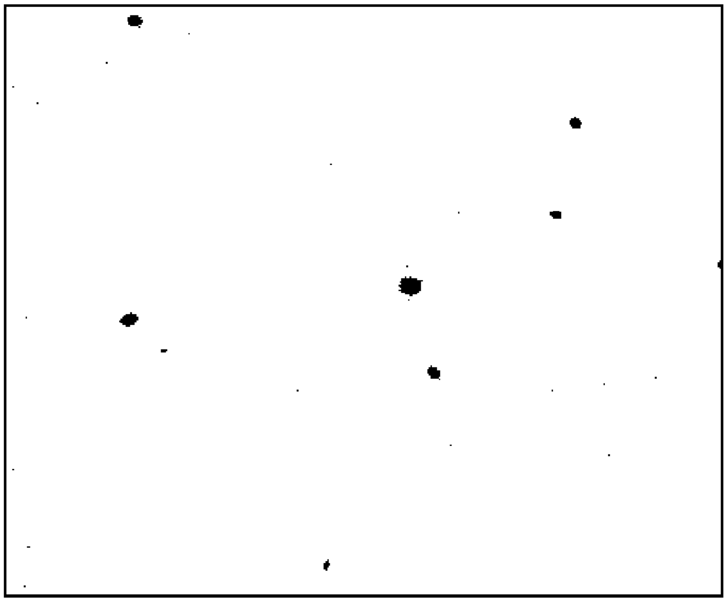
FIG. 7 is an image of marker emissions from a marker with a large particle size, coated on a white card.
Figure 8:
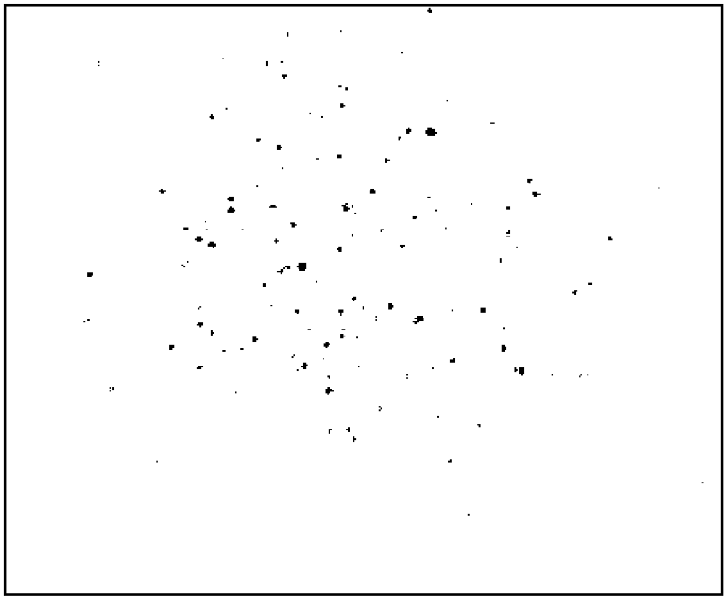
FIG. 8 is an image of marker emissions from a marker with a small particle size, coated on a white card.
Figure 9:
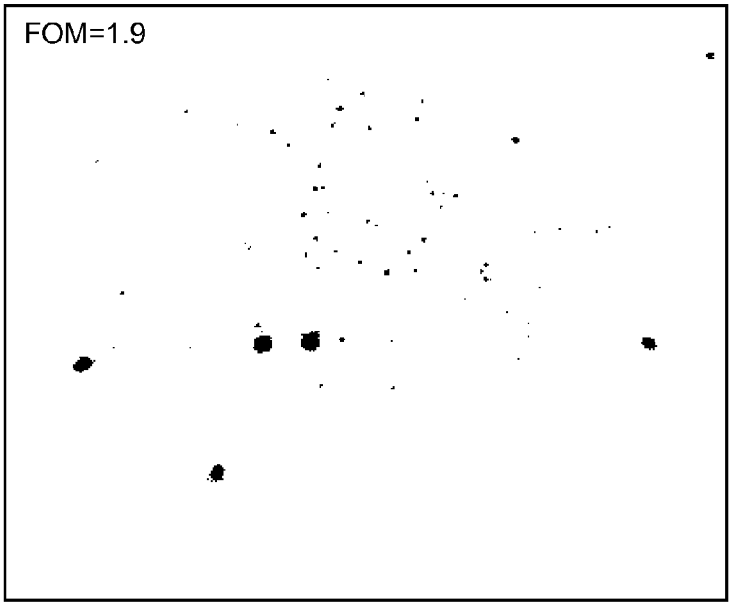
FIG. 9 is an image of marker emissions from security marker material made up of equal parts of the small and large marker particles from FIGS. 7 and 8 respectively, coated on a white card. The FOM for this mixture is 1.9.
Figure 10:
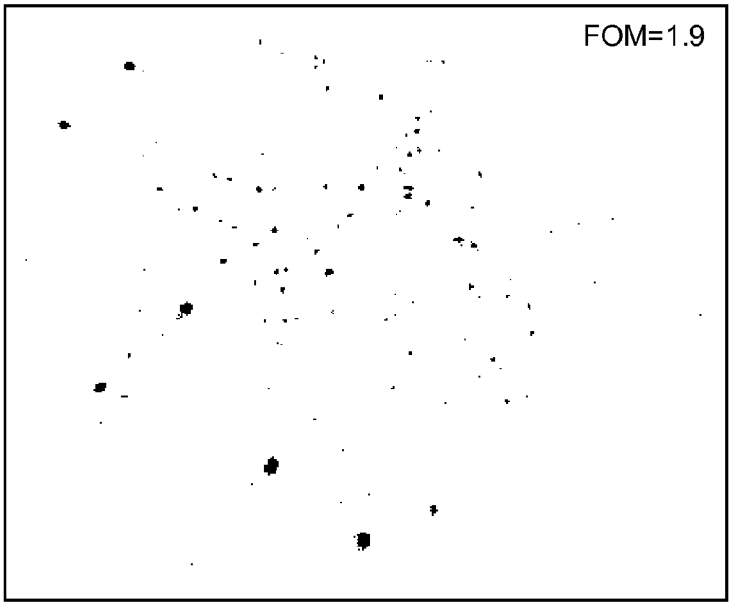
FIG. 10 is an image of marker emissions from a replicate coating of the security marker material described in FIG. 9.

FIGS. 9 and 10 show the images of marker emission obtained for security marker materials made up of two particles with two different size distributions, where the size distributions were chosen to produce a FOM of 1.9. FIGS. 7 and 8 show the images of marker emissions from the separate marker components of the mixtures used for FIGS. 9 and 10. The emission images from security marker material containing two marker size distributions (FIGS. 9 and 10) are clearly distinguishable from emission images of the individual marker components (FIGS. 7 and 8). The images in FIGS. 7-10 have been printed in a negative fashion (black on white) to aid in detection of small spots.

While the human eye is very adept at evaluating and detecting differences between images, it is desirable to be able to evaluate images of particle emission in an automated fashion, either by evaluation of batches of images with a computer or by incorporating evaluation algorithms into a portable security marker detector. As an example of how an evaluation algorithm can be developed, the particle analysis routines in ImageJ software are used to evaluate the images shown in FIGS. 7-10 and to generate parameters related to the size and distribution of emission spots in each image. An algorithm is then developed that would authenticate only these emission images containing mixtures of the two particles sizes and which would reject emission images of the individual components. The algorithm consists of evaluating and tabulating the spot sizes in descending order, in a given image. The average size of the six largest particles is calculated and the average size of the smallest 25% of the particles is calculated. If the top six particles have a average size greater than 160 pixels and the smallest 25% of the particles have an average size less than 30 then the image is passed and the marked item is deemed to be authentic. Table 2 shows these particle parameters for the two images of the security marker material shown in FIGS. 9 and 10 as well as the two additional images of replicate coatings of the same material. Table 2 also shows these particle parameters for the component marker material images shown in FIGS. 7 and 8. It is clear from Table 2 that only the images of emission from marker materials coatings containing the mixture of particles pass the authentication criteria.

TABLE 2

Particle parameters and authentication criteria for images of the security marker material comprised of two particles sizes with a FOM of 2.7 (FIGS. 7 to 10). Sizes are in relative (arbitrary) units.

| Marker material is comprised of the following particle groups | # of particles | Mean size of largest six particles: ($M_6$) | Mean size of smallest 25% particles: ($M_q$) | $M_6$ > 160? | $M_q$ < 30? | Authentic? |
|---|---|---|---|---|---|---|
| small | 75 | 88 | 13.6 | no | yes | no |
| large | 10 | 628 | 56 | yes | no | no |
| Small + large: replicate 1 | 52 | 324 | 12 | yes | yes | yes |
| Small + large: replicate 2 | 7 | 224 | 14 | yes | yes | yes |
| Small + large: replicate 3 | 70 | 236 | 13.6 | yes | yes | yes |
| Small + large: replicate 4 | 72 | 572 | 13.2 | yes | yes | yes |

The exact character of the emissive image from a security marker material depends on the security marker, the item it is applied to and the design of the imaging security marker detector. The authentication criteria must therefore be customized to each new combination of security marker material, substrate, and detector.

In a particularly preferred embodiment at least one of the following parameters are used as authentication criteria: the luminance values (intensity) of pixels corresponding to bright spots in the particle emissive image, the distribution of the luminance values of pixels corresponding to bright spots in the particle emissive image, the temporal decay of luminance values of pixels corresponding to bright spots in the particle emissive image, the excititation wavelength of particles corresponding to bright spots in the particle emissive image, the emission wavelength of particles corresponding to bright spots in the particle emissive image. The FOM that has been defined has the useful property of being independent of particle size scale as long as the ratios of the mean equivalent-spherical diameters of the two particle distributions and the ratios of the standard deviations of the two particle distributions remain constant.

In examples above, a unique marker material was generated by mixing two particles with different size distributions, where the size distributions satisfy the requirement: $[(x-z)^2/(S_x^2+S_z^2)]^{1/2} \geqq 1$. It is equally possible to synthesize marker materials with a unique multimodal size distribution directly, eliminating the particle mixing step.

Thus, security markers or combinations of security markers are chosen so as to give a distinctive image of emitting marker when imaged by the appropriate detector system. If marker image characteristics are part of the marker code, it is impossible to use non-imaging analysis methods, such as spectroscopic methods, to determine all parts of the marker code. If marker emission image characteristics are part of the marker code, in the absence of the exact authentication system used to generate the marker image, it is very difficult to use imaging analysis methods to determine image-based parts of the marker code, since the marker image is very dependent on the device used to generate the image and the counterfeiter does not know what aspects of the marker image are important to replicate.

The invention has been described in detail with particular reference to certain preferred embodiments thereof, but it will be understood that variations and modifications can be effected within the scope of the invention.

PARTS LIST

| | |
|---|---|
| 10 | security marker detection system |
| 12 | item to be authenticated (label) |
| 14 | varnish overcoat |
| 16a | emissive marker |
| 16b | emissive marker |
| 18 | electromagnetic radiation |
| 20 | electromagnetic radiation |
| 22 | first illumination device |
| 24 | second illumination device |
| 26 | electromagnetic radiation |
| 28 | electromagnetic radiation |
| 30 | set of optical filters |
| 32 | lens assembly |

-continued

PARTS LIST

| | |
|---|---|
| 34 | camera assembly |
| 36 | imaging detector |
| 38 | image processing unit |
| 40 | display unit |
| 42 | control circuit |
| 44 | filter array |

The invention claimed is:

1. A security system comprising:

a security marker material comprised of emissive particles and the emissive particles are grouped into at least two groups with different size distributions and the size distributions satisfy the formula:

$$[(x-z)^2/(S_x^2+S_z^2)]^{1/2}>1$$

wherein x and z are the volume-weighted mean equivalent-spherical diameters of the two particle distributions and $S_x$ and $S_z$ are the standard deviations of the same two distributions;

placing the emissive materials in or on an item;

exciting the emissive materials with electromagnetic radiation in one or more specified spectral bands;

detecting electromagnetic radiation in a one or more spectral bands from the emissive materials in an image-wise fashion.

2. The security system of claim 1 wherein the item is one of the following: a printed label, a cardboard box, a woven label, a document, an ID card, a pharmaceutical container, a thread, a film, a hologram, a color shifting ink patch.

3. The security system of claim 1 wherein the emissive material is applied to an item by printing or spraying.

* * * * *